(12) United States Patent
Hayashi et al.

(10) Patent No.: US 7,357,373 B2
(45) Date of Patent: Apr. 15, 2008

(54) PILOT-TYPE TWO-PORT VALVE

(75) Inventors: Bunya Hayashi, Tsukubamirai (JP);
Shinji Miyazoe, Tsukubamirai (JP);
Shinichi Yoshimura, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 11/446,382

(22) Filed: Jun. 5, 2006

(65) Prior Publication Data
US 2006/0284135 A1 Dec. 21, 2006

(30) Foreign Application Priority Data
Jun. 15, 2005 (JP) ............... 2005-175476

(51) Int. Cl.
*F16K 1/00* (2006.01)
*F16K 15/00* (2006.01)
(52) U.S. Cl. .................... 251/330; 251/335.3
(58) Field of Classification Search ........... 251/330, 251/331, 335.3
See application file for complete search history.

(56) References Cited

U.S. PATENT DOCUMENTS 2,780,233 A * 2/1957 Volpin ............... 137/315.29
3,275,290 A * 9/1966 Siver ..................... 251/330
4,120,596 A * 10/1978 Kunkle ................... 403/14
4,526,341 A * 7/1985 Thomas ................. 251/63.5
5,056,759 A * 10/1991 Schlesch ................ 251/330
5,127,629 A * 7/1992 Holliday ................ 251/330
5,238,252 A * 8/1993 Stewen et al. .......... 277/511

FOREIGN PATENT DOCUMENTS

| JP | 08-128556 | 5/1996 |
| JP | 2001-193846 | 7/2001 |
| JP | 2004-176828 | 6/2004 |

OTHER PUBLICATIONS

U.S. Appl. No. 11/478,731, filed Jul. 3, 2006, Hayashi et al.

* cited by examiner

*Primary Examiner*—John K. Fristoe, Jr.
(74) *Attorney, Agent, or Firm*—Oblon, Spivak, McClelland, Maier & Neustadt, P.C.

(57) ABSTRACT

A two-port valve includes a valve part configured to open and close a valve seat in a liquid flow path connecting a first port and a second port by a valve member and a pilot-type valve driving mechanism to open and close the valve member through a rod. The rod passes through an insertion hole of a plate facing on the liquid flow path in a sealed state. The valve member is provided to the tip part of the rod and also a cap which abuts against the periphery of the insertion hole of the plate when the valve member opens the valve seat and prevents intrusion of foreign material in the liquid into the insertion hole is provided to the rod.

6 Claims, 6 Drawing Sheets

PILOT-TYPE TWO-PORT VALVE

TECHNICAL FIELD

The present invention relates to a pilot-type two-port valve which is attached to a flow path for liquid such as water, oil, etc. to open or close the flow path, and more particularly relates to a pilot-type two-port valve configured to prevent intrusion of foreign material (chips) into a seal part in a insertion hole in a plate through which a rod passes.

BACKGROUND ART

In general, to a flow path for fluid such as air, water, oil, etc., a switching valve for allowing or blocking the flow of the fluid is provided. Such switching valve has a first port and a second port for fluid flow, a valve seat for connecting the first port and the second port is provided in the fluid path, and a valve member for opening and closing the fluid path by contacting with and separating from the valve seat is provided. The valve member is connected to a piston through a rod, a pressure operating chamber is provided on the valve member side of the piston, and a coil spring is provided on the opposite side. The piston, by supplying pressure fluid from a pilot valve to the pressure operating chamber, moves the valve member in a direction separating the valve seat against spring force of the coil spring for return, and while discharging the pressure fluid, moves the valve member in a direction pressing and contacting to the valve seat by using the spring force of the coil spring Japanese Unexamined Patent Application Publication No. 2001-193846).

Such pilot-type two-port valve which drives the piston by using the pressure fluid and the coil spring quickly operates, that is, the speed to drive the piston to open and close the fluid path by separating the valve member from the valve seat and bringing the valve member in contact with the valve seat is fast. Accordingly, the pilot-type two-port valve is preferable to the valve for gas and low-pressure liquid.

However, particularly in a liquid flow path of high-pressure liquid such as coolant, due to rapid increase of valve-outlet pressure at the time of valve opening, sometimes foreign material such as chips which are flowing in the flow path intrude into a seal part in an insertion hole in a plate through which a rod passes. In such a case, the sealing material in the seal part may be damaged and the sealing performance at the seal part may be decreased. Then, the liquid which is flowing in the liquid flow path may flow into a valve driving mechanism and the valve function of the switching valve can be lost.

Such a problem occurs to not only the normally closed or opened single-acting valve which uses the coil spring for return but also occurs to a double-acting valve.

DISCLOSURE OF INVENTION

An object of the present invention is to provide a pilot-type two-port valve which prevents intrusion of foreign material which is flowing in a liquid flow path into a seal part in an insertion hole in a plate through which a rod passes as much as possible and prevents the seal part from being damaged by the intrusion of the foreign material so as to lengthen the life of the seal part.

To achieve the object, the present invention provides a pilot-type two-port valve which includes a valve part having a valve seat formed in a liquid flow path for connecting a first port and a second port and a valve member for opening and closing the valve seat, and a valve driving mechanism for driving the valve member by the workings of pilot fluid pressure. The valve driving mechanism has a rod which passes through an insertion hole of a plate facing on the liquid flow path in a sealed state and whose tip end is protruding in the fluid path, and the valve member is connected to the tip part of the rod. To the part protruding in the liquid flow path, a cap which abuts against the periphery of the insertion hole of the plate when the valve member opens the valve seat and reduces intrusion of foreign material in the liquid into the insertion hole is provided.

In the present invention, it is preferable that a flange abutting against the periphery of the insertion hole for preventing intrusion of foreign material into the seal part of the insertion hole is provided to the cap in the pilot-type two-port valve. The cap is fit in the valve member, and the valve member is attached to the tip part of the rod through.

Further, it is preferable to provide, to the flange part of the cap, a fine path which communicates with the inside and outside of the flange when the flange abuts against the periphery of the insertion hole in the plate.

In the present invention, it is also possible to provide a protective cap for preventing foreign material from coming close to the cap to the periphery of the cap.

The protective cap is arranged so that one end of the protective cap is fixed to the plate and the other end surrounds a cylindrical surface of an outer circumference of the valve member.

Further, the protective cap can be made of a metal bellows arranged between the plate and the valve member.

Further, in the present invention, it is preferable that in the insertion hole of the plate, a first seal part for sealing pressure from the valve driving mechanism and a second seal part for preventing foreign material which is flowing in the liquid flow path from intruding are provided, a groove is provided between the first seal part and the second seal part, and lubricant for lubricating between the first seal part and the second seal part and the rod is filled in the groove.

In the pilot-type two-port valve according to the present invention, it is possible to prevent the intrusion of the foreign material which is flowing in the liquid flow path into the seal part in the periphery of the insertion hole in the plate through which the rod passes. Accordingly, the life of the seal part can be lengthened and it can be possible to prevent that the valve function of the pilot-type two-port valve is lost because of the liquid which is flowing in the flow path intruding into the valve driving mechanism.

Further, if the protective cap which prevents the foreign material from coming close to the cap is provided to the periphery of the cap, it is possible to prevent the intrusion of the foreign material into the seal part in the insertion hole throughout all strokes of the rod.

BEST MODE FOR CARRYING OUT THE INVENTION

Figure 1:
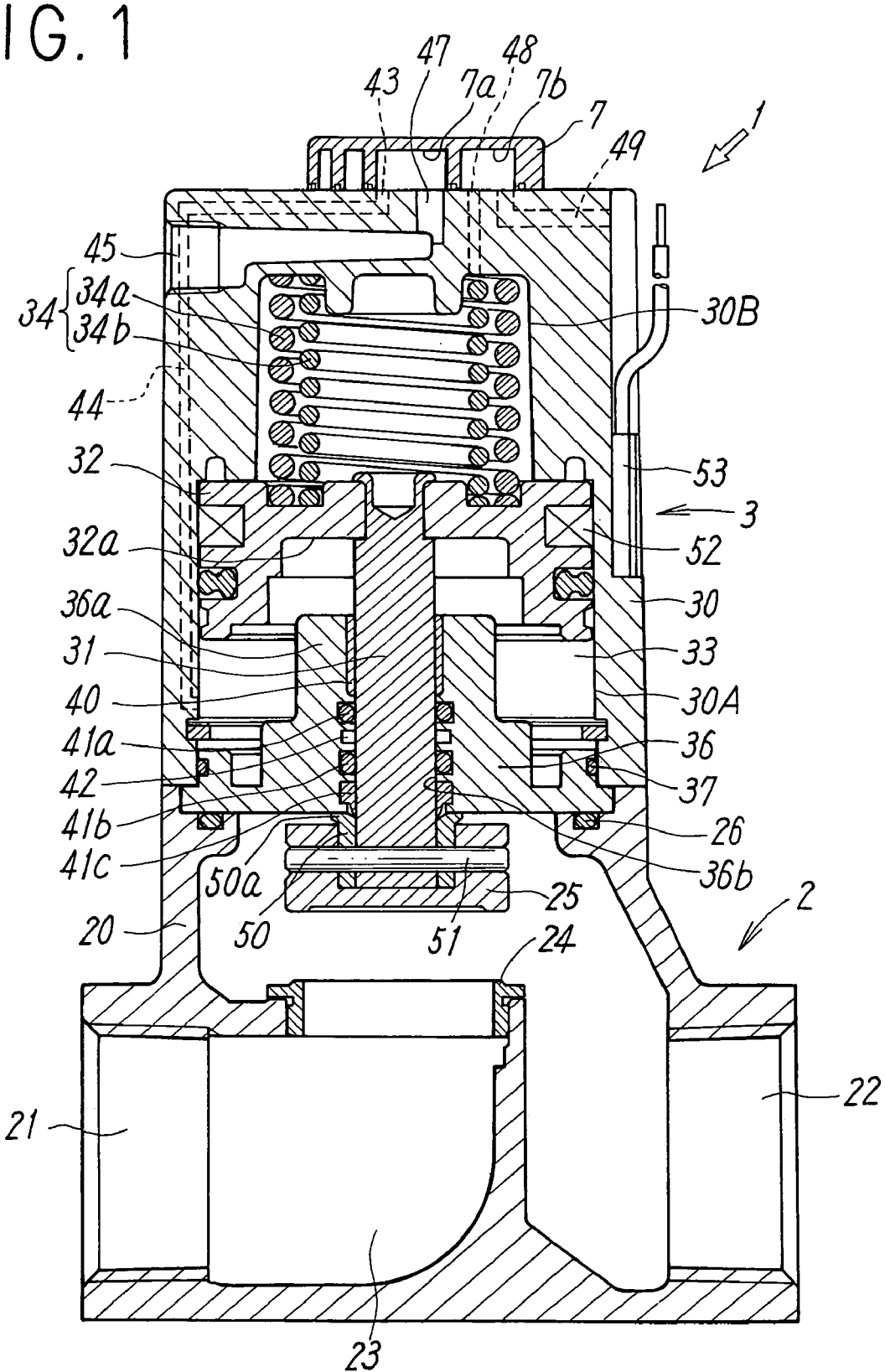
FIG. 1 is a vertical sectional view of a pilot-type two-port valve according to a first embodiment of the present invention in a state that the valve is opened.

FIG. 1 illustrates an overall structure of a pilot-type two-port valve according to a first embodiment of the present invention.

The essential part of a pilot-type two-port valve 1 includes a valve part 2 which has, in a valve body 20, a liquid flow path 23 formed between a first port (input port) 21 and a second port (output port) 22 to which a valve seat 24 is provided, and a valve member 25 which opens and closes the liquid flow path 23 by contacting with and separating from the valve seat 24; a valve driving mechanism part 3 which opens and closes the valve member 25 by driving a piston 32 which is connected to the valve member 25 through a rod 31 by using pilot fluid pressure; and a pilot valve (not shown) which supplies the pilot fluid to valve driving mechanism part 3 and discharges the pilot fluid from valve driving mechanism part 3.

The valve driving mechanism part 3 drives the valve member 25, and in a casing 30 which houses the valve driving mechanism part 3, includes a cylinder part 30A which slidably houses a piston 32 which is connected to the valve member 25 through the rod 31 and an elastic member housing part 30B which houses an elastic member 34 having coil springs 34a and 34b. On one surface side (lower surface side) of the piston 32 in the cylinder 30A, a pressure operating chamber 33 for supplying and discharging the pilot fluid is provided. At the one surface side of the piston 32, the piston 32 can be driven in a direction separating the valve member 25 from the valve seat 24 by using the pilot fluid pressure.

In order to divide between the pressure operating chamber 33 in the casing 30 and the flow path 23 in the valve body 20 in the valve part 2, the end part of the pressure operating chamber 33 side in the casing 30 is sealed with a plate 36 which is fit through a seal part 37. The plate 36 is hermetically attached to the valve body 20 in the valve part 2 through a seal part 26.

On the other hand, in the elastic member 34 which is located on the opposite side of the pressure operating chamber 33 through the piston 32, the elastic member 34 which biases the piston 32 to close the valve is provided between the piston 32 and the end wall of the elastic member housing part 30B in a compressed state.

In the center of the piston 32, a concave part 32a which is opened on the pressure operating chamber 33 side is provided and the rod 31 is fixed to the center of the piston 32 in the concave part 32a.

The plate 36 includes, on the opposite surface of the piston 32 through the pressure operating chamber 33, a column-shaped part 36a which fits the concave part 32a in the piston 32 each other, and to the central part of the column-shaped part 36a, an insertion hole 36b through which the rod 31 passes is provided. By sequentially providing a guide bush 40, a first seal part 41a, a second seal part 41b, and a third seal part 41c from the pressure operating chamber 33 side on the inner circumferential surface of the insertion hole 36b, provides the rod 31 slidability and ability to seal the liquid against the liquid flow path 23. Further, a groove 42 is provided between the first seal part 41a and the second seal part 41b, and by filling lubricant in the groove 42, lubricity is provided between the first seal part 41a and the second seal part 41b and the rod 31. The first seal part 41a seals the pressure from the valve driving mechanism, the second seal part 41b prevents foreign material which flows in the liquid flow path flow path 23 from intruding, and the third seal part 41c functions as a scraper for scraping dust adhered to the rod 31.

Figure 2:
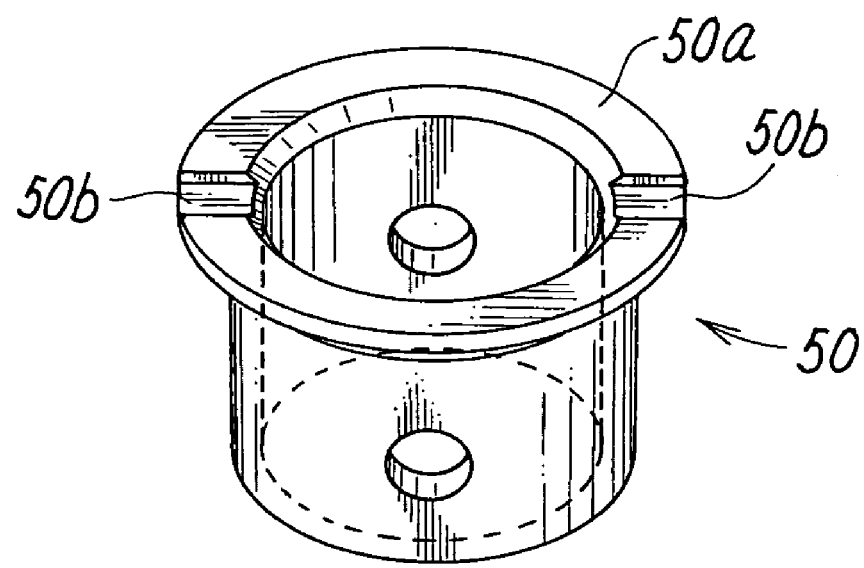
FIG. 2 is an enlarged perspective view of the essential portion shown in FIG. 1.

To an attaching part of the valve member 25 in the rod 31, a cap 50 (see FIG. 2) which has a flange 50a which abuts on the periphery of the insertion hole 36b in the plate 36 when the valve is opened is provided. The cap 50 protects the first seal part 41a, the second seal part 41b, and the third seal part 41c from rapid increase of pressure on the secondary side (back surface side) of the valve member 25 and prevents intrusion of foreign material which flows in the liquid flow path flow path 23 into the seal parts 41b and 41c in the insertion hole 36b. The cap 50 is fit into the valve member 25. The valve member 25 is attached to the tip end of the rod 31 through the cap 50 with a pin 51.

On the periphery of the cap 50, a groove-like fine path 50b which communicates with the inner and outer space of the flange 50a in a state that the cap 50 abuts against the periphery of the insertion hole 36b in the plate 36 is provided. The fine path 50b prevents that the cap 50 itself presses the liquid which is flowing in the liquid flow path 23 into the seal parts 41a to 41c in the insertion hole 36b when the valve is opened.

The pressure operating chamber 33 provided between the piston 32 in the cylinder part 30A and the plate 36 communicates with a pilot through hole 43 by a pilot flow path 44 which is opened on the inner circumferential surface of the cylinder part 30A from the pilot through hole 43 which is opened on the upper surface of the casing 30 through the inside of the casing 30.

To the upper part of the casing 30, a pilot supply/discharge port 45 which is connected to a pilot fluid resource through a pilot valve is provided. The pilot supply/discharge port 45 communicates with the pilot through hole 43 by communicating with an input through hole 47 which is opened on the upper surface of the casing 30 and a communication groove path 7a in a flow path setting plate 7 which is fixed on the casing 30.

Further, to the upper surface of the casing 30, a breathing flow path 49 which opens a breathing hole 48 in the elastic member housing part 30B and communicates with the inside of the flow path setting plate 7 and the side surface of the casing 30 in the upper part of the casing 30 is provided. The breathing hole 48 and the breathing flow path 49 on the upper surface of the casing 30 communicate with each other by a communication flow path 7b in the flow path setting plate 7.

In the pilot-type two-port valve, the pilot supply/discharge port 45 which is provided to the upper part of the casing 30 can be connected to the pilot fluid resource and the pilot valve for supplying and discharging the pilot fluid can be arranged on the upper surface of the casing 30. In this case, the pilot valve is arranged on the casing 30 with the input through hole 47 being connected to the input port of the pilot valve, the pilot through hole 43 being connected to the output port of the pilot valve, and the breathing hole 48 and the discharge port of the pilot valve are connected to the breathing flow path 49.

In the thus structured pilot-type two-port valve 1, when electric current is supplied to the pilot valve, the pilot fluid which flows through the pilot supply/discharge port 45 runs into the pressure operating chamber 33 through the pilot flow path 44, the pilot fluid drives the piston 32 against the spring force of the elastic member 34 by the fluid pressure, the valve member 25 is driven through the rod 31, the valve member 25 is separated from the valve seat 24 and the liquid flow path 23 is opened.

When the valve member 25 fully opens the valve seat 24 as described above, the flange part 50*a* of the cap 50 provided to the attaching part of the valve member 25 in the rod 31 abuts against the periphery of the insertion hole 36*b* in the plate 36 through which the rod 31 passes. Accordingly, the seal parts 41*b* and 41*c* can be protected against rapid increase of pressure on the secondary side of the valve member 25 and can be prevented from the foreign material which flows in the liquid flow path flow path 23 intruding into the seal parts 41*a* to 41*c* in the insertion hole 36*b* and damages the seal parts. Therefore, it can also be possible to lengthen the life of the seal parts.

Further, since the fine path 50*b* which is provided to the periphery of the cap 50 communicates with inner and outer space of the flange 50*a*, it can be possible to prevent the cap 50 from pressing the liquid which is flowing in the liquid flow path 23 into each of the seal parts 41*a* to 41*c* in the insertion hole 36*b* when the valve is opened.

On the other hand, when closing the opened liquid flow path 23, in a reverse order of the above-described order, the pilot fluid is discharged, the pilot fluid pressure in the pressure operating chamber 33 decreases, the piston 32 is driven in a direction of closing the valve by the spring force of the elastic member 34, the valve member is pressed and contacts with the valve seat 24, and the liquid flow path is closed.

In FIG. 1, a magnet 52 is provided to the piston 32 and a magnetometric sensor 53 detects a piston position by using magnetism of the magnet 52.

Figure 3:
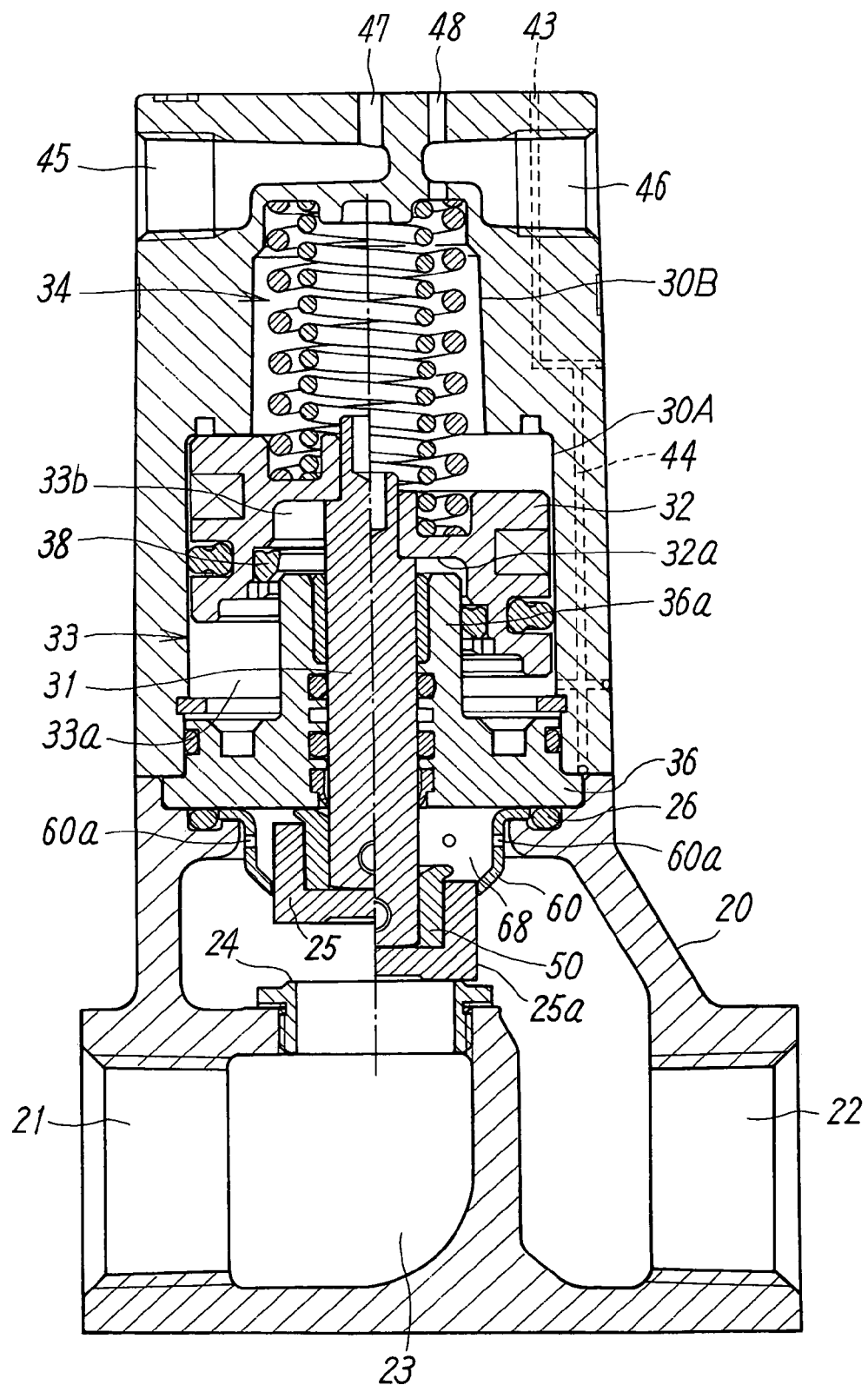
FIG. 3 is a vertical sectional view of a pilot-type two-port valve according to a second embodiment of the present invention in a state that the left side of the valve is opened and the right side of the valve is closed.

FIG. 3 illustrates a pilot-type two-port valve according to a second embodiment of the present invention in a state that the left side of the valve is opened and the right side of the valve is closed.

The pilot-type two-port valve 11 according to the second embodiment includes a protective cap 60 to prevent foreign material from coming near the cap 50 and the protective cap 60 is provided around the cap 50 which is provided to the attaching part of the valve member 25 of the rod 31.

In the second embodiment, the pressure operating chamber 33 in the first embodiment is divided into a piston pressure chamber 33*a* which is located around the base of the column-shaped part 36*a* of the plate 36 and a damper chamber 33*b* which is formed between a concave part 32*a* of the piston 32 and the tip part of the column-shaped part 36*a* of the plate 36. Between the piston pressure chamber 33*a* and the damper chamber 33*b*, a back-flow prevention member 38 which allows pilot fluid to flow into the damper chamber 33*b* from the piston pressure chamber 33*a* side and blocks the pilot fluid so that only small amount of the pilot fluid can flow through a fine path in the reverse direction. Accordingly, the pilot fluid pressure remaining in the damper chamber 33*b* functions as resistance to drive of the piston 32 and movement of the piston 32 in the direction of opening the valve is reduced so that the water hammer phenomenon caused by closing the valve can be reduced.

Further, in the first embodiment, the breathing flow path 49 is provided to the upper part of the casing 30. On the other hand, in the second embodiment, a pilot discharge port 46 is provided to discharge the pilot fluid to the outside. The discharge port 46 is connected so that the pilot fluid is discharged from the pilot through hole 43 through the pilot valve and the breathing hole 48. The discharge port 46 also functions as a breathing port of the elastic member housing part 30B.

Other structures in the second embodiment are substantially similar to those in the above-described first embodiment. Accordingly, the same numbers as in the first embodiment are applied to the same or corresponding parts and the description of these structures are omitted.

The protective cap 60 which is provided around the cap 50 is fixed by being sandwiched between the plate 36 and the valve body 20 at one end in the inner circumference of a seal part 26 provided to a connection part of the plate 36 and the valve body 20. The other end of the protective cap 60 is fit in a slidingly contacting state around a cylindrical surface 25*a* of the valve member 25 between the cylindrical surface 25*a* with a fine space to prevent foreign material which is flowing in the liquid flow path 23 from intruding. Thus, the protective cap 60 is arranged from the cylindrical surface of the outer circumference of the valve member 25 to surround around the insertion hole 36*b* of the rod 31 in the plate 36. The inner part surrounded by the protective cap 60 is a rod chamber 68 which surrounds the rod 31.

Further, to the protective cap 60, a plurality of micropores 60*a* which communicate with the inside and outside of the protective cap are provided. These micropores 60*a* reduce increase of pressure in the rod chamber 68 when the valve is opened. These micropores 60*a* are formed so that the foreign material which is flowing in the liquid flow path 23 cannot pass through.

The protective cap 60 can be applied to the two-port valve structured as described in the first embodiment.

The pilot-type two-port valve having the above structure, at all strokes of the rod 31, surrounds the rod chamber 68 in the state that the end part of the protective cap 60 slidingly contacts with the cylindrical surface 25*a* of the valve member 25. Accordingly, it is possible to prevent intrusion of the foreign material which is flowing in the liquid flow path 23 into the rod chamber 68 as much as possible. Therefore, it is also possible to prevent intrusion of the foreign material into each of the seal parts 41*a* to 41*c* in the insertion hole 36*b* of the rod 31 in the plate 36.

In the above-described first and second embodiments, the present invention is applied to the pilot-type two-port single-acting valves of normally closed type in which the valve member 25 usually closes the valve seat 24 and when electric current is supplied to the pilot valve, the valve member 25 separates from the valve seat 24 and opens the liquid flow path 23. However, the present invention is not limited to be applied to the pilot-type two-port single-acting valves of normally closed type, but can be applied to a pilot-type two-port single-acting valves of normally opened type in which the valve member 25 usually opens the valve seat 24 and when electric current is supplied to the pilot valve, the valve member 25 is pressed and contacted with the valve seat 24 by the pilot fluid pressure and closes the liquid flow path 23.

Further, in the embodiment in FIG. 3, the present invention can be applied to a pilot-type two-valve double-acting valve in which the valve member 25 is brought in contact with the valve seat 24 and separated from the valve seat 24 without being provided with the elastic member 34 in the elastic member housing part 30B of the pilot-type two-port valve by alternately supplying and discharging the pilot fluid pressure to the flow path from the pilot supply/discharge port 45 provided in the casing 30 to the pressure operating chamber 33 and the flow path from the supply/discharge port 46 to the chamber located opposite side of the pressure operating chamber 33 through the piston 32 in the cylinder part 30A.

Hereinafter, modifications of the second embodiment will be described. The structures and operation are substantially similar to those in the first embodiment or the second embodiment except for points to be individually described below.

Figure 4:
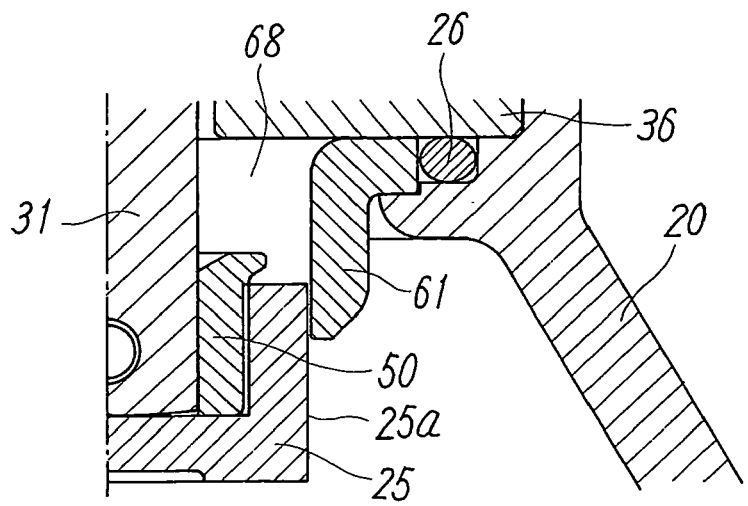
FIG. 4 is a cross-sectional view of an essential portion of a protective cap according to a mode of operation of the present invention.

FIG. 4 is an enlarged cross-sectional view of an essential portion of the two-port valve according to a mode of operation of the second embodiment.

In the two-port valve in the mode of operation, a protective cap 61 for preventing foreign material from coming near the cap is formed of porous material made of sintered metal which is used for a filter element etc. As well as the case in FIG. 3, the protective cap 61 is fixed by being sandwiched between the plate 36 and the valve body 20 at one end. Further, the other end of the protective cap 61 is closely arranged without abutting against the cylindrical surface 25a of the outer circumference of the valve member 25 and with a fine space to prevent foreign material which is flowing in the liquid flow path 23 from intruding. By the structure, it is not necessary to provide a micropore to the protective cap 61 and it can be possible to reduce the intrusion of the foreign material into the rod chamber 68 as much as possible.

The material of the protective cap 61 in the mode of operation is not limited to the above-described porous material made of the sintered metal, but a porous synthetic resin such as PVA sponge can also be used.

Figure 5:
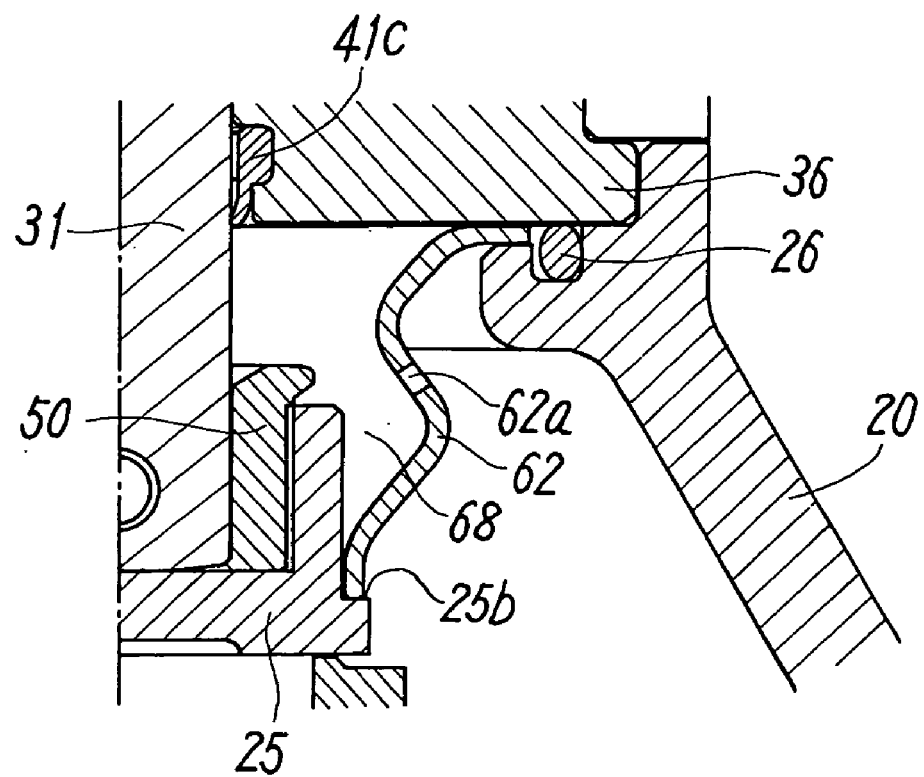
FIG. 5 is a cross-sectional view of an essential portion of a protective cap according to a mode of operation of the present invention.

In other mode of operation shown in FIG. 5, a protective cap 62 is formed by a metal bellows. The metal bellows which forms the protective cap 62 is fixed by being sandwiched between the plate 36 and the valve body 20 at one end in the inner circumference of the seal part 26 provided to the connection part of the plate 36 and the valve body 20. The other end of the protective cap 62 abuts against a collar part 25b which is protrudingly provided around the valve member 25. Thus, the metal bellows is arranged so as to surround the cylindrical surface of the outer circumference of the valve member 25 and the rod 31. To the inner part surrounded by the protective cap 62, a rod chamber 68 in which the rod 31 slides is provided. Further, to the protective cap 62, a plurality of micropores 62a which communicate with the inside and outside of the protective cap 62 are provided.

Figure 6:
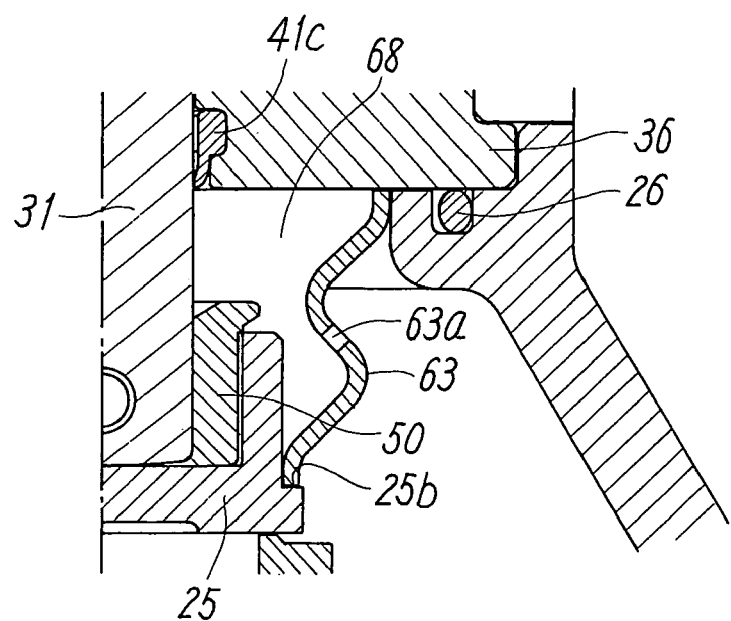
FIG. 6 is a cross-sectional view of an essential portion of a protective cap according to a mode of operation of the present invention.

Since the metal bellows which forms the protective cap 62 elastically expands and contracts in an axis line direction, it is not always necessary that the end part of the metal bellows on the side sandwiched between the plate 36 and the valve body 20 of the protective cap 62 is sandwiched between the plate 36 and the valve body 20. As a protective cap 63 shown in FIG. 6, the metal bellows can be slidingly contacted with the inner circumference of the connection part of the plate 36 and the valve body 20 and can be attached between the plate 36 and the collar part 25b of the valve member 25 with elastic stretching tendency. To the protective cap 63, a plurality of micropores 63a which communicate with the inside and outside of the protective cap 63 are also provided.

Figure 7:
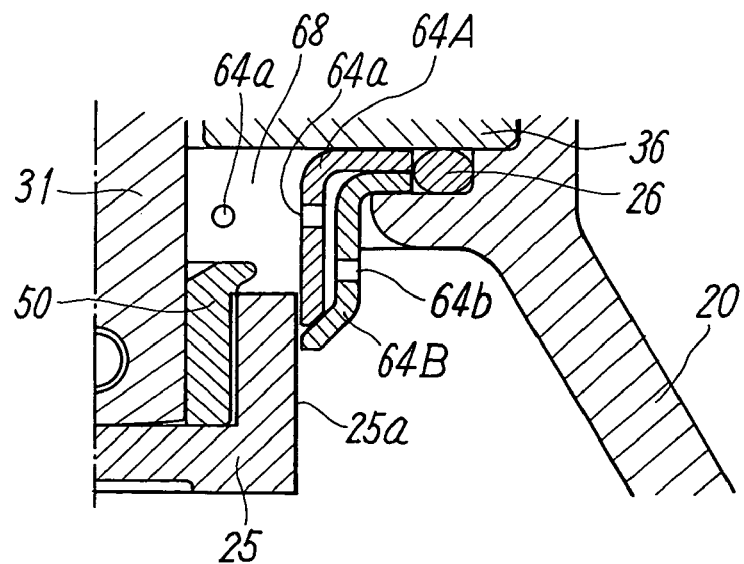
FIG. 7 is a cross-sectional view of an essential portion of a protective cap according to a mode of operation of the present invention.

In a mode of operation shown in FIG. 7, a protective cap 64 is doubly formed to slidingly contact with the cylindrical surface 25a of the outer circumference of the valve member 25 so that sealing performance against the foreign material in the area can be increased.

That is, the protective cap 64 has an inner cap 64A and an outer cap 64B and in a connecting part of the plate 36 and the valve body 20, one end of the inner cap 64A and the outer cap 64B are sandwiched between the plate 36 and the valve body 20 so that the protective cap 64 is fixed. On the other hand, the other end of the inner cap A is arranged opposite between the cylindrical surface 25a of the outer circumference of the valve member 25 so that the other end substantially slidingly contact with the cylindrical surface 25a. The tip of the other end of the outer cap B is bent in substantially dogleg shape to the valve member 25 side to cover the inner cap 64A and arranged opposite so that the other end substantially slidingly contact with the cylindrical surface 25a of the outer circumference of the valve member 25.

The inner cap 64A and the outer cap 64B constitute the double protective cap 64 as a whole to surround the periphery of the insertion hole 36b (see FIG. 1) of the rod 31 from the cylindrical surface 25a of the outer circumference of the valve member 25 to the plate 36. The interior surrounded by the protective cap 64 is the rod chamber 68.

Further, to the inner cap 64A and the outer cap 64B which constitute the protective cap 64, a plurality of micropores 64a and 64b which communicate with the inside and outside of the protective cap 64 are provided at positions not opposite each other. These micropores 64a and 64b enable to prevent the intrusion of the foreign material into the rod chamber 68 as much as possible and also reduces the increase of pressure in the rod chamber 68 when the valve is opened.

Figure 8:
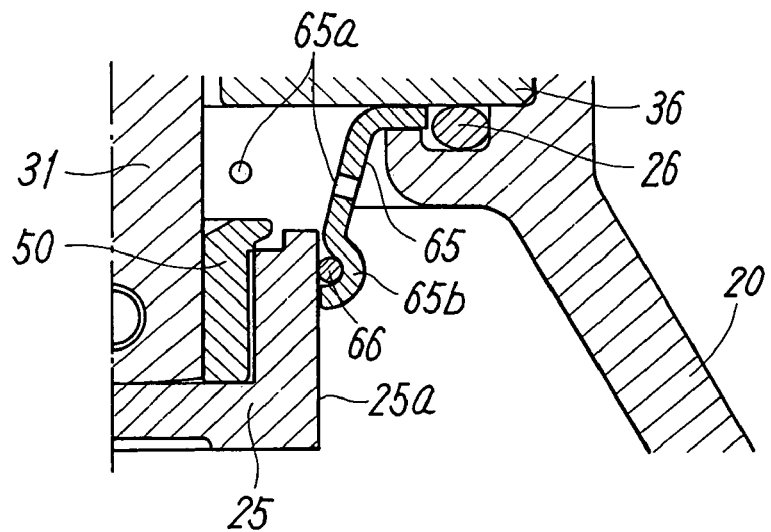
FIG. 8 is a cross-sectional view of an essential portion of a protective cap according to still other mode of operation of the present invention.

A protective cap 65 according to a mode of operation shown in FIG. 8 has a holding part 65b which holds a substantially U-shaped seal member which is opened at a slidingly contacted side at the end part of the side slidingly contacting with the cylindrical surface 25a of the outer circumference of the valve member 25. A seal member 66 is fit into the holding part 65b to seal between the cylindrical surface 25a. The tip end of the protective cap 65 on the side slidingly contacts with the valve member 25 of the protective cap 65 is formed to slidingly contact with the cylindrical surface 25a of the outer circumference of the valve member 25. By the tip end of the protective cap 65 and the seal member 66, it can be possible to doubly seal the cylindrical surface 25a of the outer circumference of the valve member 25. Further, to the protective cap 65, a plurality of micropores 65b which communicate with the inside and outside of the protective cap 65 are provided.

The invention claimed is:

1. A pilot-type two-port valve comprising:
a valve part having a valve seat formed in a liquid flow path for connecting a first port and a second port and a valve member for opening and closing the valve seat; and
a valve driving mechanism for driving the valve member by pilot fluid pressure, the valve driving mechanism having a rod which passes through an insertion hole of a plate facing on the liquid flow path in a sealed state and having a tip end protruding in the fluid path, and a tip end of the rod being connected to the valve member;
wherein to the part protruding in the liquid flow path, a cap is provided which abuts against the periphery of the insertion hole of the plate when the valve member opens the valve seat and prevents intrusion of foreign material in the liquid into the insertion hole wherein said cap includes a flange abutting against the periphery of the insertion hole for preventing intrusion of foreign material into the seal part of the insertion hole, and wherein a fine path is provided on the flange interposed between the flange and the plate and communicates with the inside and outside of the cap when the flange abuts against the periphery of the insertion hole in the plate, the cap is fitted within the valve member, and wherein the valve member is attached to the tip end of the rod through the cap.

2. The pilot-type two-port valve according to claim 1, wherein a protective member for preventing foreign material from coming close to the cap is provided to the periphery of the cap.

3. The pilot-type two-port valve according to claim 2, wherein one end of the protective member is fixed to the plate and the other end is arranged so as to surround a cylindrical surface of an outer circumference of the valve member.

4. The pilot-type two-port valve according to claim 2, wherein the protective member is made of metal bellows arranged between the plate and the valve member.

5. The pilot-type two-port valve according to claim 1, wherein in the insertion hole of the plate, a first seal part for sealing pressure from the valve driving mechanism and a second seal part for preventing foreign material which is flowing in the liquid flow path from intruding are provided, a groove is provided between the first seal part and the second seal part, and lubricant for lubricating between the first seal part and the second seal part and the rod is filled in the groove.

6. The pilot-type two-port valve according to claim 1, wherein the fine path comprises a grooved shaped path and wherein a plurality of fine paths are provided on upper surface of the flange.

* * * * *